O. T. BLÁTHY.
RADIAL POLE DYNAMO ELECTRIC MACHINE.
APPLICATION FILED JAN. 31, 1912.
1,142,009.
Patented June 8, 1915.
3 SHEETS—SHEET 1.
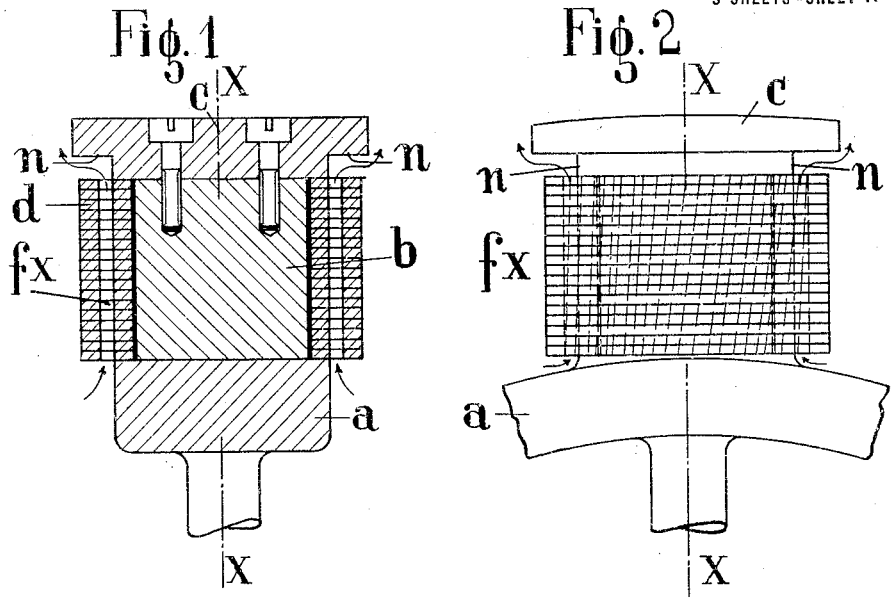
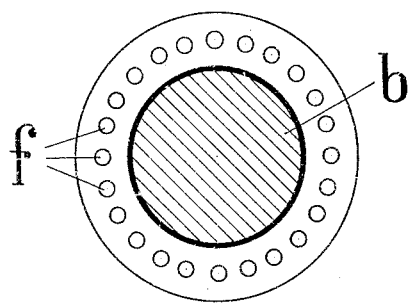
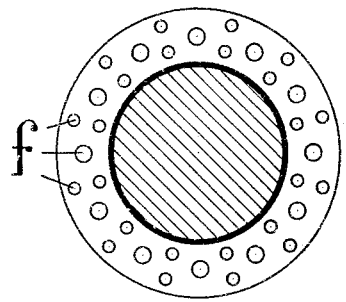
WITNESSES
INVENTOR
O. T. BLÁTHY
BY
ATTORNEY

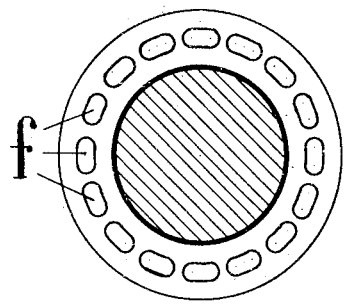
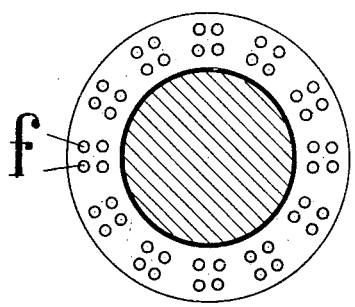
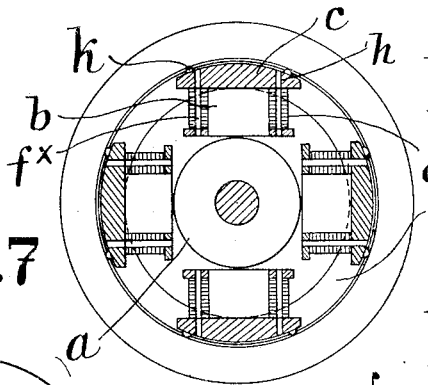
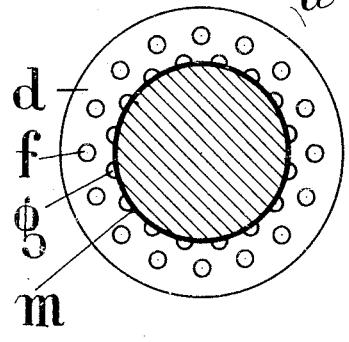
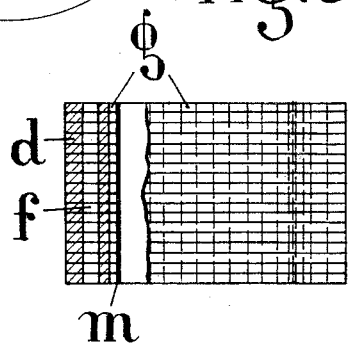

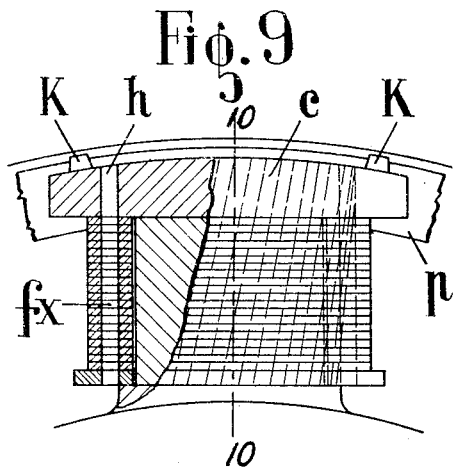
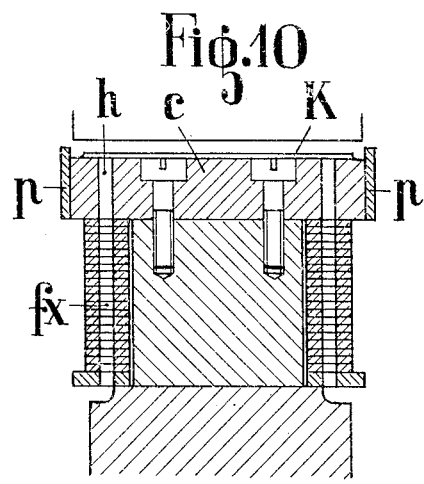
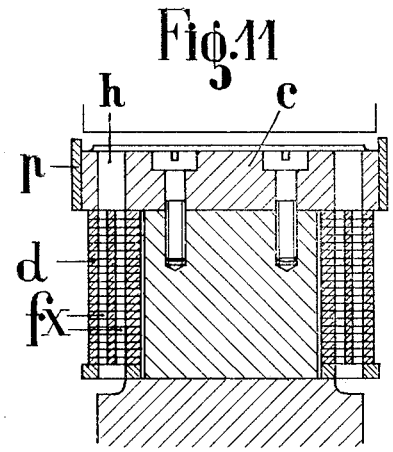
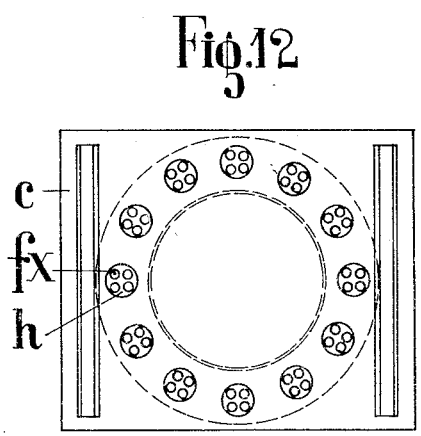

UNITED STATES PATENT OFFICE.

OTTO TITUS BLÁTHY, OF BUDAPEST, AUSTRIA-HUNGARY.

RADIAL-POLE DYNAMO-ELECTRIC MACHINE.

1,142,009.  Specification of Letters Patent.  Patented June 8, 1915.

Application filed January 31, 1912. Serial No. 674,581.

*To all whom it may concern:*

Be it known that I, OTTO TITUS BLÁTHY, engineer, a subject of the King of Hungary, residing at Budapest, in the Empire of Austria-Hungary, have invented new and useful Improvements in Radial-Pole Dynamo-Electric Machines; and I do hereby declare the following to be a full, clear, and exact description of the same.

This invention relates to revolving field electric machines and more particularly to cooling devices for revolving field coils having convolutions comprising flat layers wound on edge.

To this end I have provided cut-away portions or perforations in the metal of each convolution, the cut-away portion or perforations of the different convolutions registering to form ventilating channels through which air is impelled by centrifugal force as the field magnets revolve. Also I have provided pole shoes having channels forming continuations of the channels in the coils and terminating in the pole faces, the air-gap area in which terminate said continuations being provided with inclosing ribs separating it from the space between adjacent magnet poles, so that the air pressure generated between the magnet poles, by centrifugal force, will not be communicated to said air gap area and the ventilation channels and thus equalize the pressure generated in the ventilating channel.

Other features of the invention will appear as the description proceeds.

In the accompanying drawings, showing, by way of example, several forms of the invention, Figure 1 is a central longitudinal section of one embodiment of the invention; Fig. 2 is a side elevation of the embodiment shown in Fig. 1; Fig. 3 is a plan view, partly in section, showing a convolution of the coil of Figs. 1 and 2; Figs. 4 to 7 are plans, partly in section, showing magnets provided with convolutions having different shapes and arrangements of perforations; Fig. 8 is a side elevation partly in longitudinal section of the field coil of Fig. 7; Fig. 9 is a side elevation, partly in section, of another form of the invention; Fig. 10 shows a section taken on the line 10—10 of Fig. 9; Fig. 11 is a sectional view, similar to Fig. 10, showing an arrangement of a common channel in the pole shoe for each group of channels in the field coil; Fig. 12 is a plan of the form shown in Fig. 11, and Fig. 13 is a side elevation partly in section, showing a machine having field magnets in accordance with Fig. 9.

Referring first to Figs. 1 to 3, the body of the rotor $a$ has mounted thereon the core $b$ of the field magnets, to which core is secured the pole shoe $c$. The field coil consists of a metallic tape $d$ wound on edge, as shown, and having insulating material interposed between the respective convolutions of the coil.

The convolutions of the metallic tape $d$ together with the insulating material thereof are provided with perforations $f$, the perforations of each convolution registering with perforations of the succeeding convolutions thus forming longitudinal ventilating channels $f^x$ parallel to the axis of the coil, indicating by the line X—X of Figs. 1 and 2.

The ventilating channels may be arranged in a single row as in Figs. 1 to 3, 5, 9 and 10; they may be arranged in pairs of rows or groups as in Figs. 4, 6, 11 and 12; they may be staggered as in Fig. 4; they may have round cross-section as in Figs. 1 to 4, 6, and 9 to 12, or any suitable shape as the elongated cross-section of Fig. 5.

All the channels $f^x$ may pass through the material of the tape $d$ remote from its inner and outer edges, as shown in Figs. 1 to 6 and 9 to 12, the channel being thus bounded on all lateral sides by the material of the tape; or substantially longitudinal grooves $g$ may be provided in the inner face of the coils, as shown in Figs. 7 and 8, said grooves, together with the insulating cover $m$ of the core $b$ forming additional ventilating channels.

It is particularly stressed that I do not limit myself to any particular arrangement or shape of the channels $f^x$ or $g$, as forms and arrangements other than those shown may be used.

The circular perforations $f$ are preferably produced by boring through the coil after it is wound, but before laying the insulation between the convolutions. After the insulation is provided, it is pierced through at spots corresponding to the ventilating channels.

The rotor must be so shaped at the base of the coils, as shown in Figs. 1, 2, 9 and 10, that air may have free access to the inner ends of the ventilating channels. On the other hand, the pole shoes $c$ must be so formed as to permit the free escape of the air flowing through the ventilating channels. For this purpose, the pole shoe $c$ shown in Figs. 1 and 2 has a recess $n$ so that air leaving the ventilating channels can escape laterally. However, the arrangement shown in Figs. 9 and 10 is preferred. In this arrangement, the pole shoes are provided with channels $h$ forming continuations of the corresponding channels $f^x$, of the coils and terminating at the active face of the poles. Hence the length of the channels and, therefore, the difference of pressure between the ends thereof, produced by centrifugal force, is increased, increasing the amount of air discharged at the pole face, and therefore increasing the cooling of the stator.

If the perforations, $f^x$ are arranged in groups as in Figs. 6, 11 and 12, each channel $h$ in the pole shoe forms a common continuation of the whole corresponding group of channels $f^x$ as clearly shown in Figs. 11 and 12.

With the arrangement of Figs. 9 to 12, the channels $h$ discharge the air issuing from them into the space inclosed by ribs $k$ on the pole faces, and the lateral ventilating disks $p$, thus separating the air under centrifugal action within the channel and said space from the air in the space between the separate field magnets.

The ventilating operation, as influenced by the ribs $k$, is as follows: During the rotation of the rotor, the magnets carry along on the one hand, the mass of air inclosed in the channels $f^x$ and $h$ and the space bounded by said ribs $k$; and, on the other hand, the magnets carry along the mass of air contained between each two adjacent revolving magnets. These masses of air thus revolved are obviously subjected to the action of centrifugal force, which produces a radial flow of the air in said channels and also the air in said space between adjacent revolving magnets. By this radial flow a difference of pressure is established between points located at the base of the magnets and those situated at the circumference of the armature.

Now if the channels $f^x$ and $h$ were to communicate with the air spaces between the magnets, both at the base of the magnets and at their pole faces, equal pressures would, of course, exist at the corresponding ends of the air channels and the air space located between the magnets. That is to say, only the same difference of pressure could take place in the channels as in the air space between the field magnets. Such difference of pressure being equal, the relation of flow between the quantity of air forced through the channels $f^x$ and the quantity flowing between the field magnets would be equal to the relation between the total cross-section of the channels $f^x$ and the total cross-section of the air spaces between the magnets. As, however, the cross-section of said air space is many times greater than the combined cross-section of the channels $f^x$, only a small fraction of the total quantity of air fed by the rotor would flow through the channels $f^x$. In order to remedy this disadvantage, the ribs $k$, which are disposed as closely as possible to the stator are arranged on the pole faces so that no equalization of the pressure between the air spaces located within and outside of the ribs $k$ can take place, and to cause the air issuing from said channels guided by the ribs $k$ and $p$, to escape solely through the usual cooling passages of the stator. As a consequence hereof, a greater difference of pressure can take place in the channels $f^x$ than in the spaces between the field magnets, so that a greater quantity of air is forced through the cooling channels $f^x$.

Notwithstanding the decrease in active cross-section in the tapes $d$ caused by the perforations $f$, the cooling of the field coils is improved by my invention to such an extent, that the field coils can, with an equal temperature rise, carry a much heavier current with the ventilating channels than they can without them.

I claim as my invention:—

1. In an electric device a field coil of edgewise wound conducting tape, each convolution of the coil being provided with cutaway portions registering with the cutaway portions of the succeeding convolutions and forming ventilating channels.

2. In a dynamo electric machine, a field coil of metallic tape wound edgewise, each convolution of the coil being provided with perforations, the perforations of each convolution registering with the perforations of the succeeding convolutions and forming substantially longitudinal ventilating channels.

3. In a dynamo electric machine, a field coil of metallic conducting tape wound edgewise, the metal of each individual convolution of the coil being pierced between its edges, remote from its edges, with perforations, the perforations of each convolution registering with the perforations of the succeeding convolutions and coöperating to form substantially longitudinal ventilating passages entirely bounded laterally by the metal of the convolutions.

4. In a dynamo electric machine, the combination of a magnet core; a field coil of metallic tape wound edgewise around said core, the convolutions of the coil being provided with perforations coöperating to form longitudinal ventilating channels; and a pole shoe on the outer end of the core and adapted to permit the free escape of air from the ventilating channels.

5. In a dynamo electric machine, the combination of a magnet core; a field coil of metallic tape wound edgewise around said core, the convolutions of the coil being provided with perforations coöperating to form longitudinal ventilating channels; and a pole shoe on the outer end of said core for securing the field coil in place, and provided with channels forming continuations of said ventilating channels and passing through the pole face.

6. In a dynamo electric machine, the combination of a rotor; a plurality of magnet cores thereon; a field coil of edgewise wound metallic tape on each core, the coil being provided with longitudinal ventilating channels; a pole shoe on each core and provided with channels forming continuations of said ventilating channels and terminating in the pole face; and means on the pole face inclosing the area of the air gap in which the channels discharge.

7. In a dynamo electric machine, the combination of a rotor; a plurality of magnet cores thereon; a field coil of edgewise wound metallic tape on each core, each convolution of the coil being provided with perforations registering with the perforations of the succeeding convolutions to form longitudinal ventilating channels; a pole shoe on each core and provided with channels forming continuations of said ventilating channels and terminating in the pole face; and means on the pole face inclosing the area of the air gap in which the channels discharge.

8. In a dynamo electric machine, the combination of a rotor; a plurality of magnet cores thereon; a field coil of edgewise wound metallic tape on each core, each convolution of the coil being provided with perforations registering with the perforations of the succeeding convolutions to form longitudinal ventilating channels; a pole shoe on each core and provided with channels forming continuations of said ventilating channels and terminating in the pole face; and means on the pole face separating the area of the air gap in which the channels terminate, from the space between adjacent field magnets.

9. In a dynamo electric machine, the combination of a rotor; a plurality of magnet cores thereon; a field coil of edgewise wound metallic tape on each core; each convolution of the coil being provided with perforations registering with the perforations of the succeeding convolutions to form longitudinal ventilating channels; a pole shoe on each core and provided with channels forming continuations of said ventilating channels and terminating in the pole face; and ribs on the pole face inclosing the area of the air gap in which terminate the channels.

10. In a dynamo electric machine, the combination of a rotor; a plurality of magnet cores thereon; a field coil of edgewise wound metallic tape on each core, the coil being provided with longitudinal ventilating channels; a pole shoe on each core and provided with channels forming continuations of said ventilating channels and terminating in the pole face; and ribs on the pole face seperating the area of the air gap in which terminate the channels, from the space between adjacent field magnets.

11. In a dynamo electric machine, the combination of a revolving magnet core; a field coil of metallic tape wound edgewise around the core and provided with groups of perforations, the groups of one convolution of the coil registering with the corresponding groups of the succeeding convolutions to form groups of substantially longitudinal ventilating channels; and a pole shoe on the outer end of said core and provided with channels respectively forming common channels for all the channels of the respective groups.

12. In a dynamo electric machine, the combination of a revolving magnet core; a field coil of metallic tape wound edgewise around the core and provided with groups of perforations, the groups of one convolution of the coil registering with the corresponding groups of the succeeding convolutions to form groups of substantially longitudinal ventilating channels; and ribs on the pole face inclosing the air-gap area in which the channels terminate.

13. An edgewise wound magnet coil of metallic tape, each convolution of the coil being provided with cutaway portions registering with corresponding cut-away portions of the adjacent convolutions.

14. An edgewise wound magnet coil of metallic tape, each convolution of the tape being provided between its edges with open perforations, the perforations of the different convolutions coöperating to form channels.

15. An edgewise wound magnet coil of metallic tape, each convolution of the tape being provided between its edges with open perforations, the perforations of the different convolutions coöperating to form channels, the portion of the tape disposed between succeeding perforations serving to conduct the current and to hold the two edge portions of the tape rigidly together.

In testimony whereof, I have signed my name to this specification in the presence of two subscribing witnesses.

OTTO TITUS BLÁTHY.

Witnesses:
JOHN J. ROUTE,
HUGH KEMÉNY.